(12) United States Patent
Weyh et al.

(10) Patent No.: US 7,212,338 B2
(45) Date of Patent: May 1, 2007

(54) ARRANGEMENT FOR ILLUMINATION AND/OR DETECTION IN A MICROSCOPE

(75) Inventors: Thomas Weyh, Stadtroda (DE); Ulrich Simon, Rothenstein (DE); Guenter Schoeppe, Jena (DE); Ralf Wolleschensky, Schoeten (DE); Michael Stock, Apolda (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/943,566

(22) Filed: Sep. 16, 2004

(65) Prior Publication Data

US 2005/0073742 A1    Apr. 7, 2005

Related U.S. Application Data

(63) Continuation of application No. 09/295,555, filed on Apr. 21, 1999, now abandoned.

(30) Foreign Application Priority Data

Aug. 4, 1998  (DE) ................... 198 35 072

(51) Int. Cl.
    *G02B 21/06* (2006.01)
(52) U.S. Cl. ..................................... 359/385; 356/300
(58) Field of Classification Search ................ 250/234; 359/368, 363, 385; 356/300, 305, 326, 328
    See application file for complete search history.

(56) References Cited

U.S. PATENT DOCUMENTS

| | | | | |
|---|---|---|---|---|
| 4,844,617 A | * | 7/1989 | Kelderman et al. | 356/624 |
| 5,886,784 A | * | 3/1999 | Engelhardt | 356/326 |
| 5,949,532 A | * | 9/1999 | Schrof et al. | 356/73 |

* cited by examiner

*Primary Examiner*—Mark A. Robinson
(74) *Attorney, Agent, or Firm*—Reed Smith LLP (57) ABSTRACT

A laser scanning microscope comprises at least one selectively switchable micro-mirror arrangement (DMD) in the illumination beam path and/or detection beam path which is used for the wavelength selection of dispersively divided illumination and/or object light such as reflection, fluorescence.

10 Claims, 11 Drawing Sheets

FIG. 10

ARRANGEMENT FOR ILLUMINATION AND/OR DETECTION IN A MICROSCOPE

CROSS-REFERENCE TO RELATED APPLICATIONS

This is a continuation of U.S. application Ser. No. 09/295,555, filed Apr. 21, 1999 now abandoned, which claims priority to German Application No. 198 35 072.4, filed Aug. 4, 1998, all of which are incorporated herein by reference.

BACKGROUND OF THE INVENTION a) Field of the Invention

The invention is directed to a laser scanning microscope comprising a laser unit, scanning means, a microscope stand, a detection unit and a control/receiving unit, wherein the spectral characteristics of the detection unit can be freely programmed by a switching mirror array integrated in a monochromator. The switching mirror array (one- or two-dimensional) can be constructed, for example, as a DMD (Digital Mirror Device or switchable-mirror arrangement). The laser scanning microscope according to the invention enables different operating modes. On the one hand, the emitted spectrum can be detected with high resolution on every scanned pixel (in the specimen); on the other hand, the emitted spectrum can be divided into a quantity of spectral portions (zones on the switching mirror array) and each of these portions can be treated as a separate electronic detection channel (which is advantageous, e.g., for receiving multiple fluorescences). Further, a freely programmable confocal diaphragm (pinhole) can be realized by means of an additional switching mirror array which is introduced in a conjugate plane to the object plane.

b) Description of the Related Art

Figure 1:
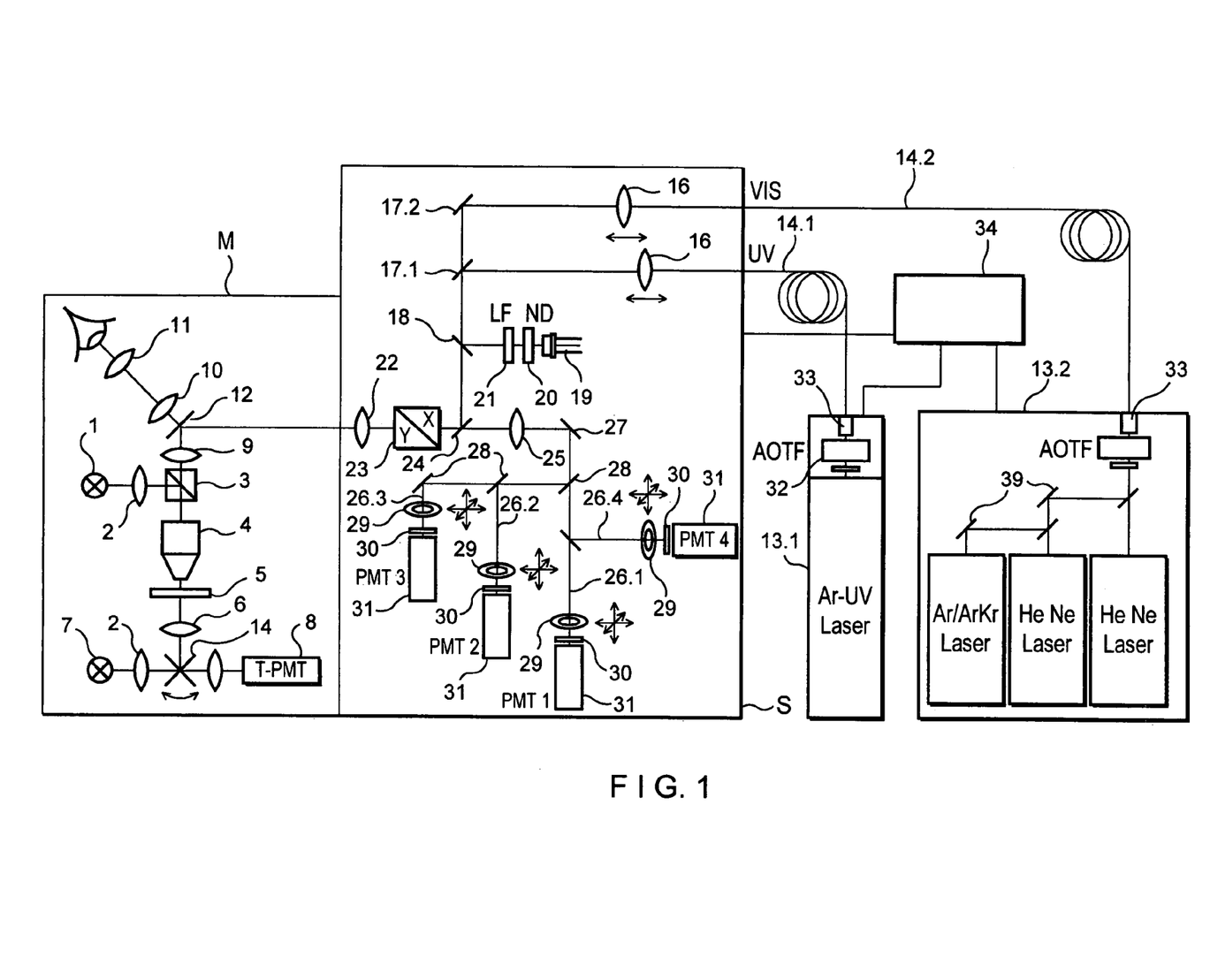
FIG. 1 is a schematic representation of a microscope M and scan head S and which form an LSM.

Modern laser scanning microscopes for examination of (fluorescing) specimens generally comprise a detection unit which divides the (fluorescent) radiation emitted from the specimen into a certain quantity of (generally up to 4) detection channels by means of dichroic splitter layers and filter layers (principle of optical multichannel analyzer—OMA). These splitters/filters are generally held in rotatable revolving wheels or linear-displaceable disks. In this way, a spectral adaptation of the channels to the spectral characteristics of the specimen radiation is possible up to a certain degree. However, since only a finite number of dielectric splitters and filters can be received in every holder and the spectral characteristics of every individual splitter/filter are determined in the process of their manufacture, this arrangement is not flexible enough to be adapted to the specimen spectrum in an optimum manner in many cases of application (FIG. 1).

A confocal microscope with DMD mirror arrays for illumination and/or detection is described in U.S. Pat. No. 5,587,832.

OBJECT AND SUMMARY OF THE INVENTION

The primary object of the invention is a laser scanning microscope which is substantially more flexible with respect to its excitation and/or detection.

The invention encompasses a laser scanning microscope with a detection unit whose spectral characteristics are freely programmable by means of a switching mirror array integrated in a monochromator.

This laser scanning microscope, according to the invention, comprises a laser unit, scanning means, a microscope stand, a detection unit and a control/receiving unit. The (fluorescent) radiation which is emitted from the specimen can be focused (in the case of confocal applications) on a confocal pinhole that is positioned in a conjugate object plane. This pinhole then simultaneously represents the entrance aperture of a (grating) monochromator which divides the specimen radiation into its spectral components through its dispersive effect. An at least one-dimensional switching mirror array on which the specimen spectrum is optically imaged (FIG. 2) is located in the focal plane of the dispersive medium (grating).

The at least one-dimensional switching mirror array comprises a quantity of individually controllable switching mirrors. While the scanning means essentially dwell on one specimen point, one mirror after the other can now be individually controlled (and therefore switched), e.g., sequentially, and the individual spectral components of the specimen radiation are accordingly reflected onto a suitably synchronized detector sequentially for reception of the entire spectrum.

Alternatively, adjacent mirror zones corresponding to whole spectral bands can be controlled in parallel in order to simultaneously detect entire frequency bands in this way (one band after the other or a plurality of bands simultaneously). In the case of fluorescent radiation, those mirror pixels that correspond to the excitation radiation can advantageously be omitted from the detected spectrum.

Figure 3A:
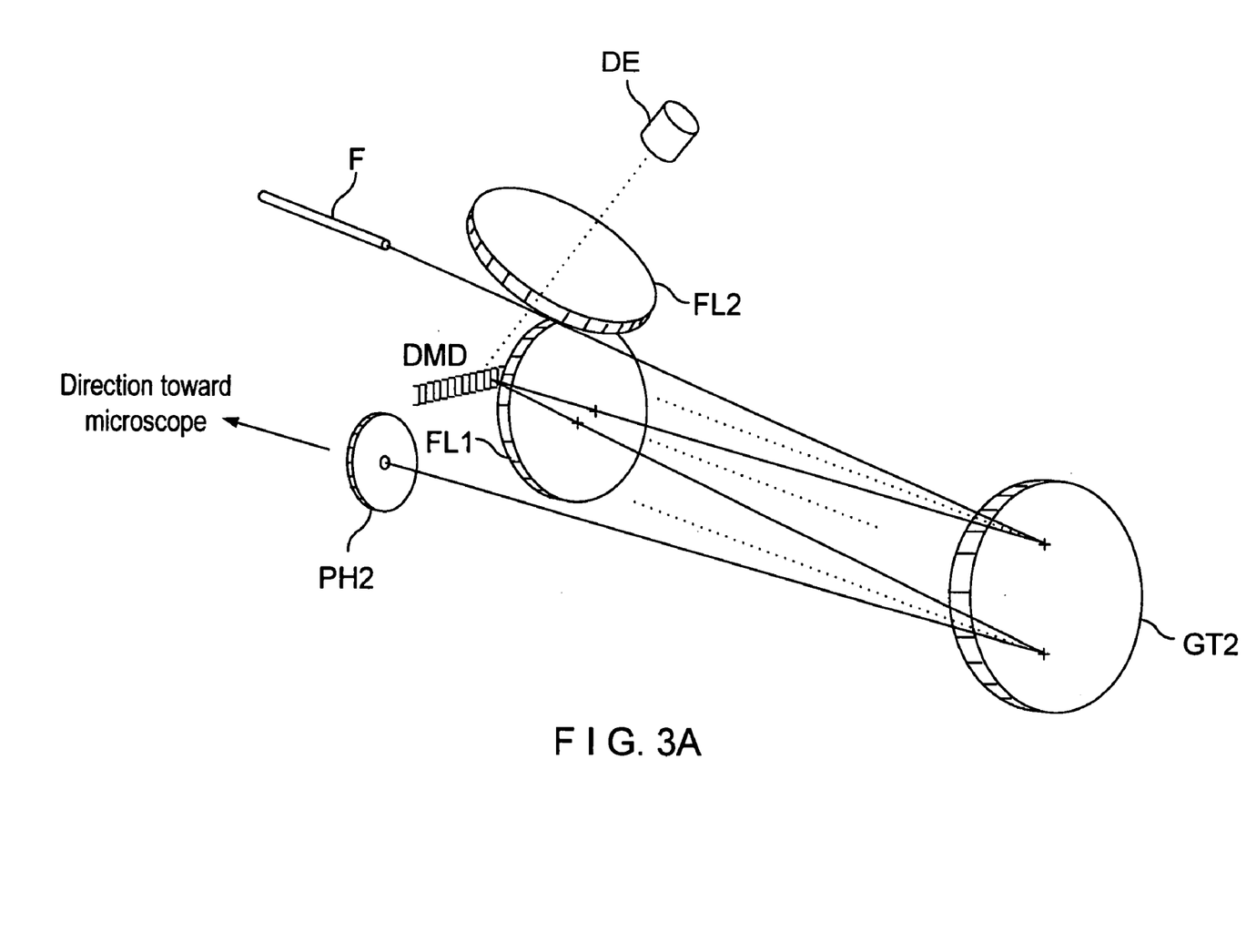
FIGS. 3a and 3b are optical arrangements indicating how the excitation radiation can be coupled into the system in accordance with the invention.
Figure 3B:
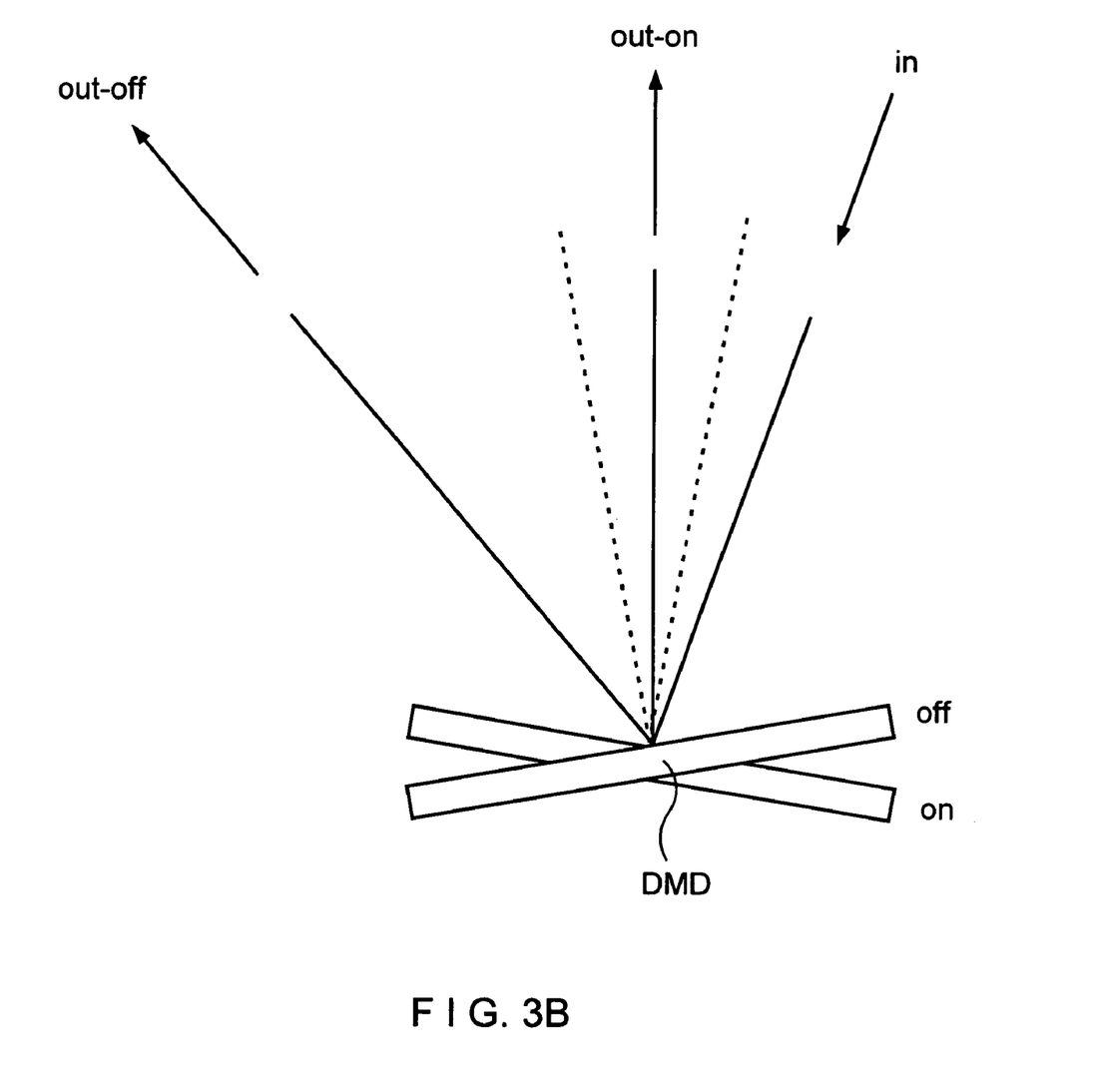

In a variant, the excitation radiation can advantageously be coupled into the system via the mirror pixels corresponding to the excitation (FIGS. 3a, b). The need for a main beam splitter (DBS) is therefore circumvented and an appreciably more compact system construction can be realized. In addition, the excitation radiation in this case automatically passes through the detection pinhole as illumination pinhole, which leads to an improvement in beam quality (spatial filtering) and therefore improved spatial resolution of the entire microscope system. In addition, by means of oscillating the mirror utilized for reflecting the excitation radiation between two possible mirror positions, the illumination intensity can be adjusted in an almost continuous manner and can be changed in a synchronized manner with respect to the scan pixels (shading compensation, intensity modulation, etc.).

Further, a freely programmable confocal diaphragm (pinhole) can be realized (FIG. 4) by means of another switching mirror array which is introduced in a conjugate plane to the object plane. This pinhole is freely programmable with respect to shape and size (adjustable confocal volume) as well as with respect to lateral position, which increases the flexibility of the system and is a great advantage for the adjustment of the optical system (autoadjustment of pinhole). In addition, in multichannel applications, the pinhole size can be synchronized with the spectral band detected at that instant in order that optical sections independent from the wavelength can be realized with the confocal microscope. In addition, the pinhole size can also be advantageously adapted to the intensity of the fluorescent radiation when various fluorescences of very different intensity are present simultaneously in the specimen and are to be detected.

Figure 5:
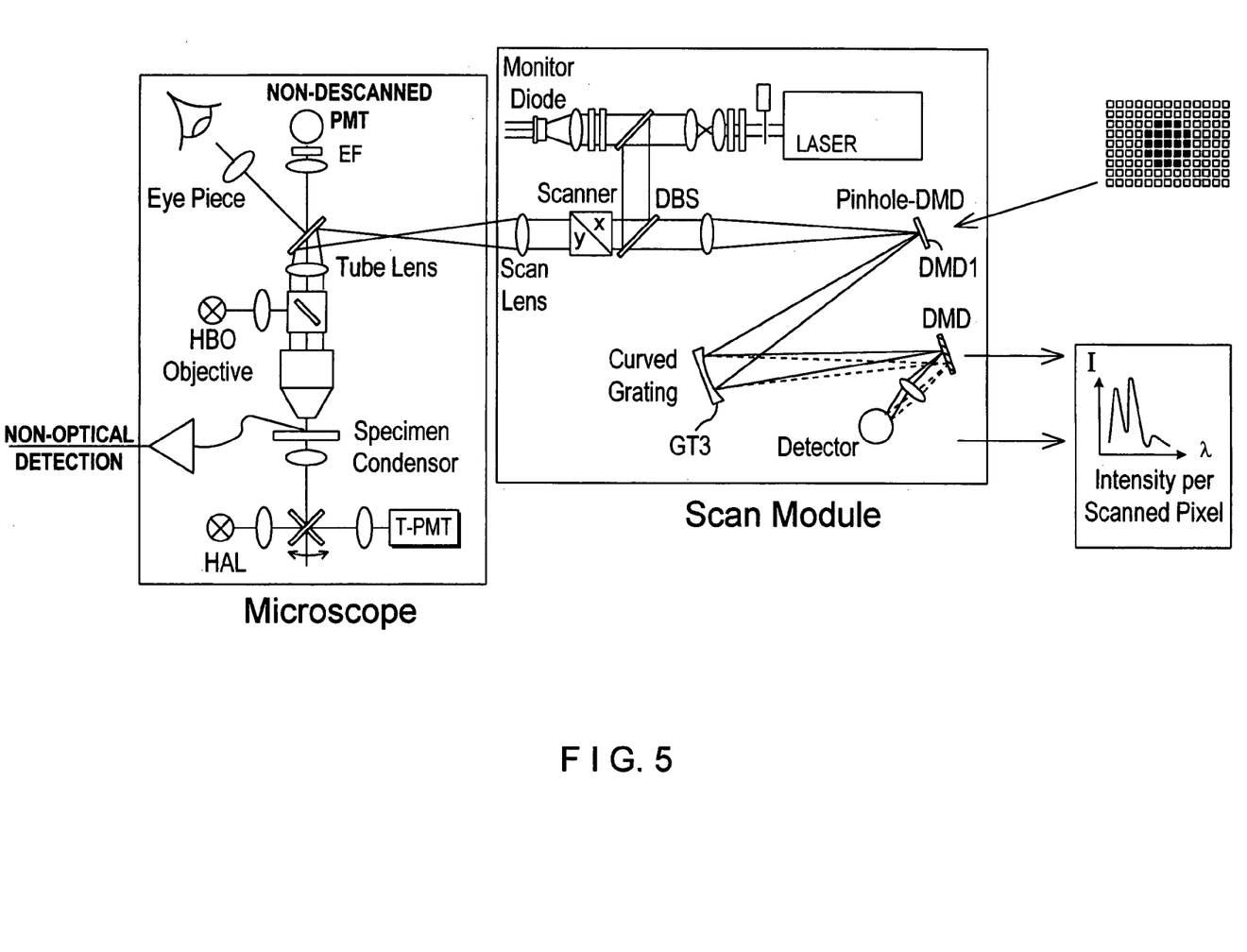
FIG. 5 is a schematically represented further embodiment using a curved grating.

In an advantageous variant, a curved grating can be used, which curved grating likewise takes over the collimation and the dispersion of the radiation to be detected and accordingly results in a reduced quantity of optical components (FIG. 5).

The structural size of the arrangement according to the invention in its entirety is accordingly advantageously reduced. Above all, this leads to a greater optical stability of the detection system.

In a variant, the optical grating can be replaced by a prism. In this way, an increase in the efficiency of the optical system is potentially possible (FIG. 6), particularly in the detection of unpolarized light.

Figure 7:
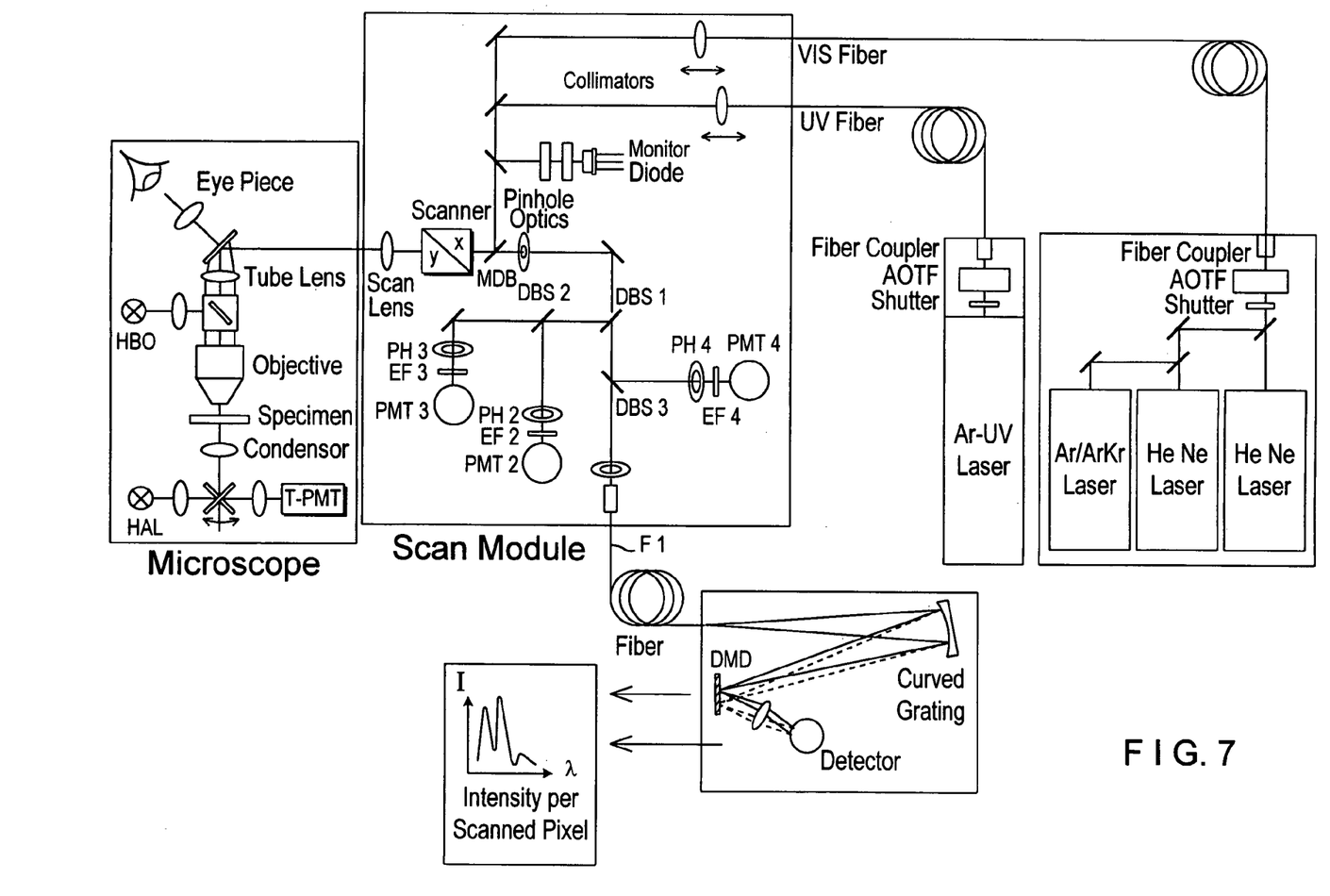
FIG. 7 is a schematically represented embodiment which employs an additional fiber for carrying out a spectral characterization of the emission radiation of the microscopic specimen.

In a variant, the spectroscopic system can also be adapted to an existing state-of-the-art laser scanning microscope in order to carry out a spectral characterization of the emission radiation of the microscopic specimen. This can be carried out in particular via a fiber coupling of the spectrometric unit to the laser scanning microscope, wherein the fiber can be arranged, for example, directly behind one of the confocal pinholes (FIG. 7).

Figure 8:
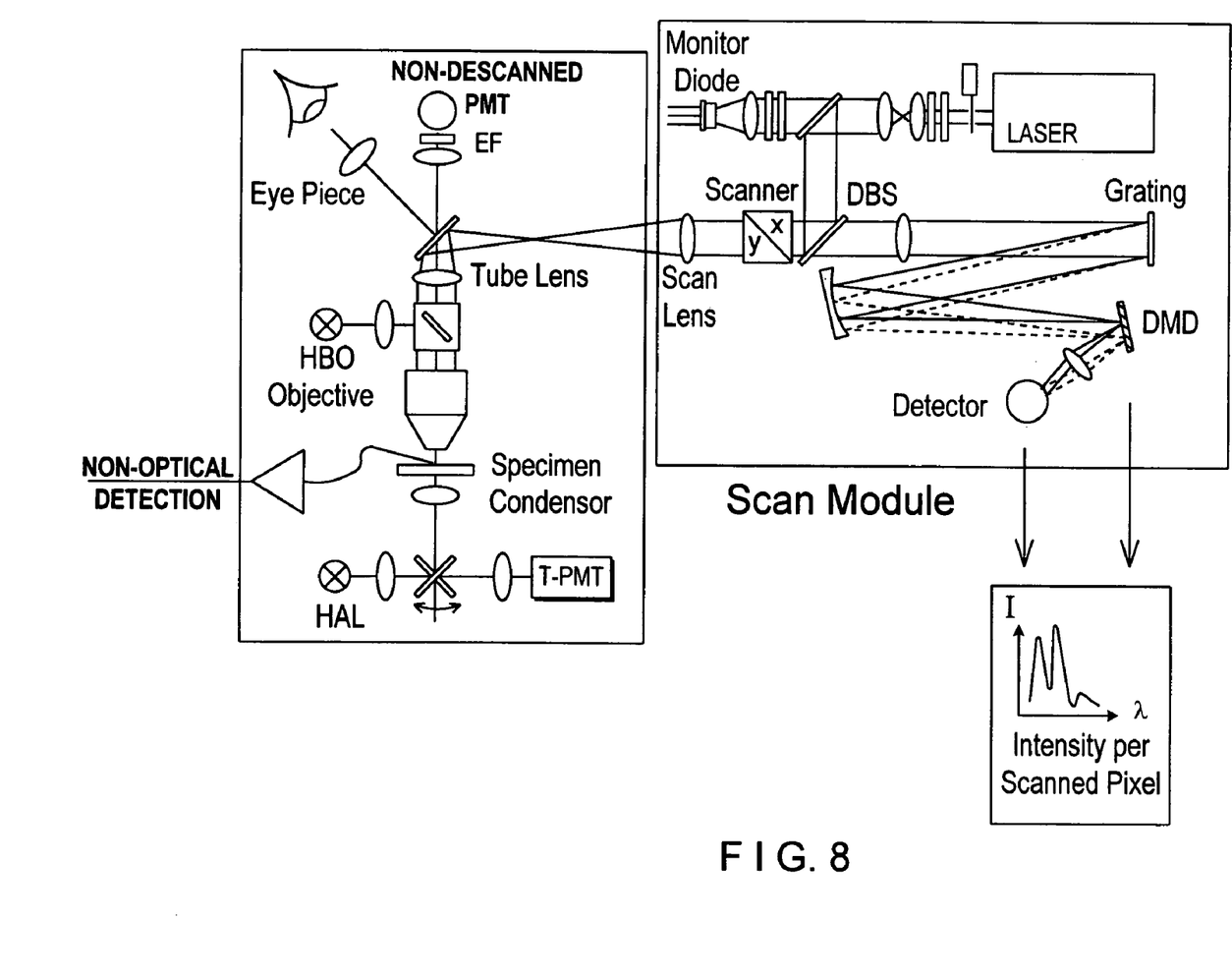

In a variant which has as subject matter the excitation of multiphoton fluorescence, a confocal diaphragm can be entirely dispensed with due to the three-dimensionally spatially resolved excitation (FIG. 8). In this case, in the arrangement according to the invention, the confocal diaphragm in the monochromator entrance diaphragm plane can be omitted and the emission light can be radiated directly onto the dispersive medium.

In fluorescence microscopy, application in the biomedical field is generally concentrated in the wavelength band from approximately 350 to 800 nm. The wavelength resolution required for application lies in the range of about 0.5 nm. At the present time, switching mirror arrays can be obtained (also commercially) in a wide variety of constructions (e.g., from Texas Instruments, Inc., Dallas, Tex.), also, for example, in 576×864 $pixel^2$ display form. Accordingly, when imaging the spectrum along the 864 pixels, a resolution of about 0.5 nm can be realized. The individual mirrors can be switched in a digitally controlled manner between two highly-stable positions (±10°), wherein the switching process is concluded within approximately 300 ns. The reflecting mirrors can be digitally programmed optionally and independently from one another.

Gratings, prisms or combinations thereof, for example, can be used as dispersive media in the constructions described above. By using these components in a double-pass configuration, the effective dispersion can be doubled and a particularly compact construction of the laser scanning microscope can accordingly realized in an advantageous manner.

Figure 9:
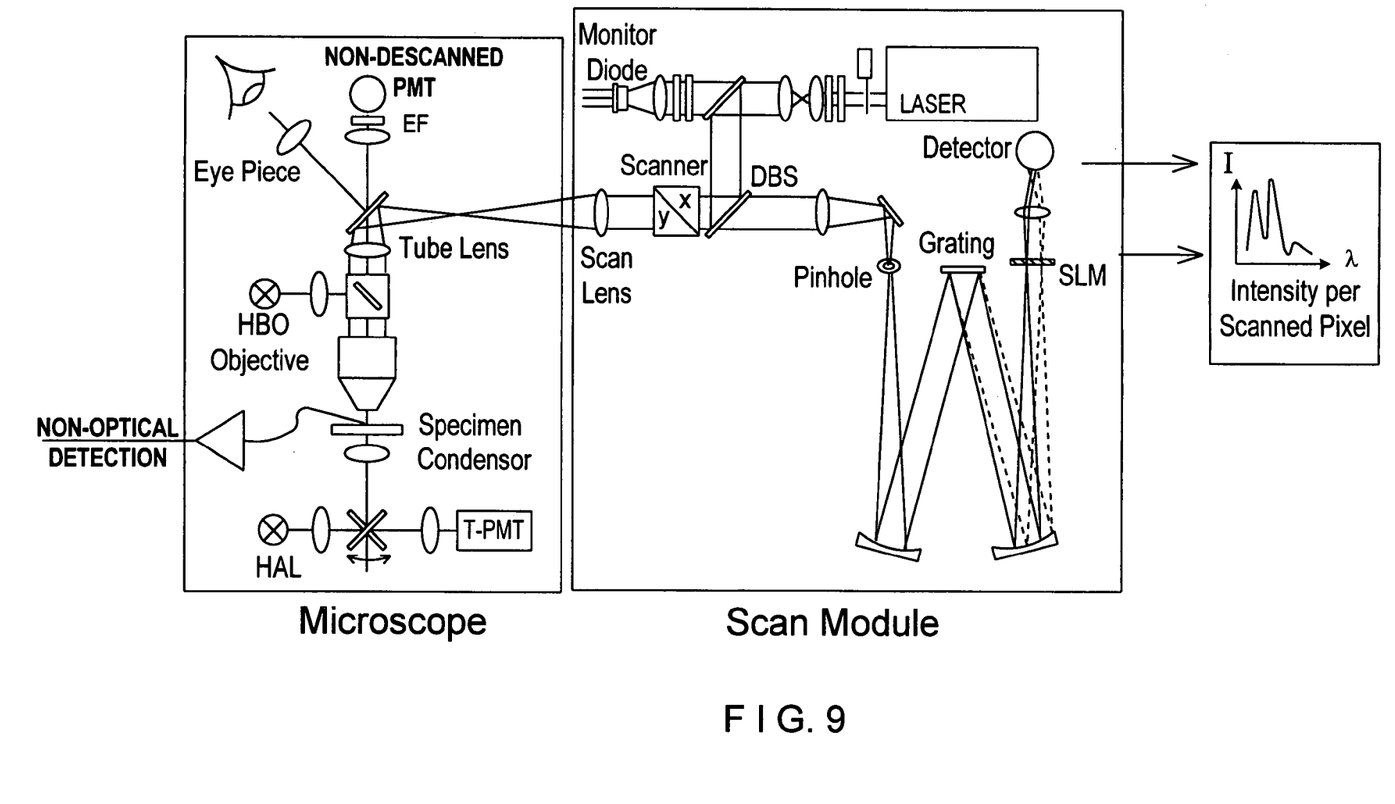
FIG. 9 further schematically shows an arrangement as in FIG. 2 but which includes a transmissive modulator which passes only the relevant wavelength of the dispersed spectrum.

In principle, all of the arrangements described herein can also be realized in transmission mode by using a transmission array (LCD array; liquid crystal) instead of the switching mirror array (FIG. 9).

Figure 2:
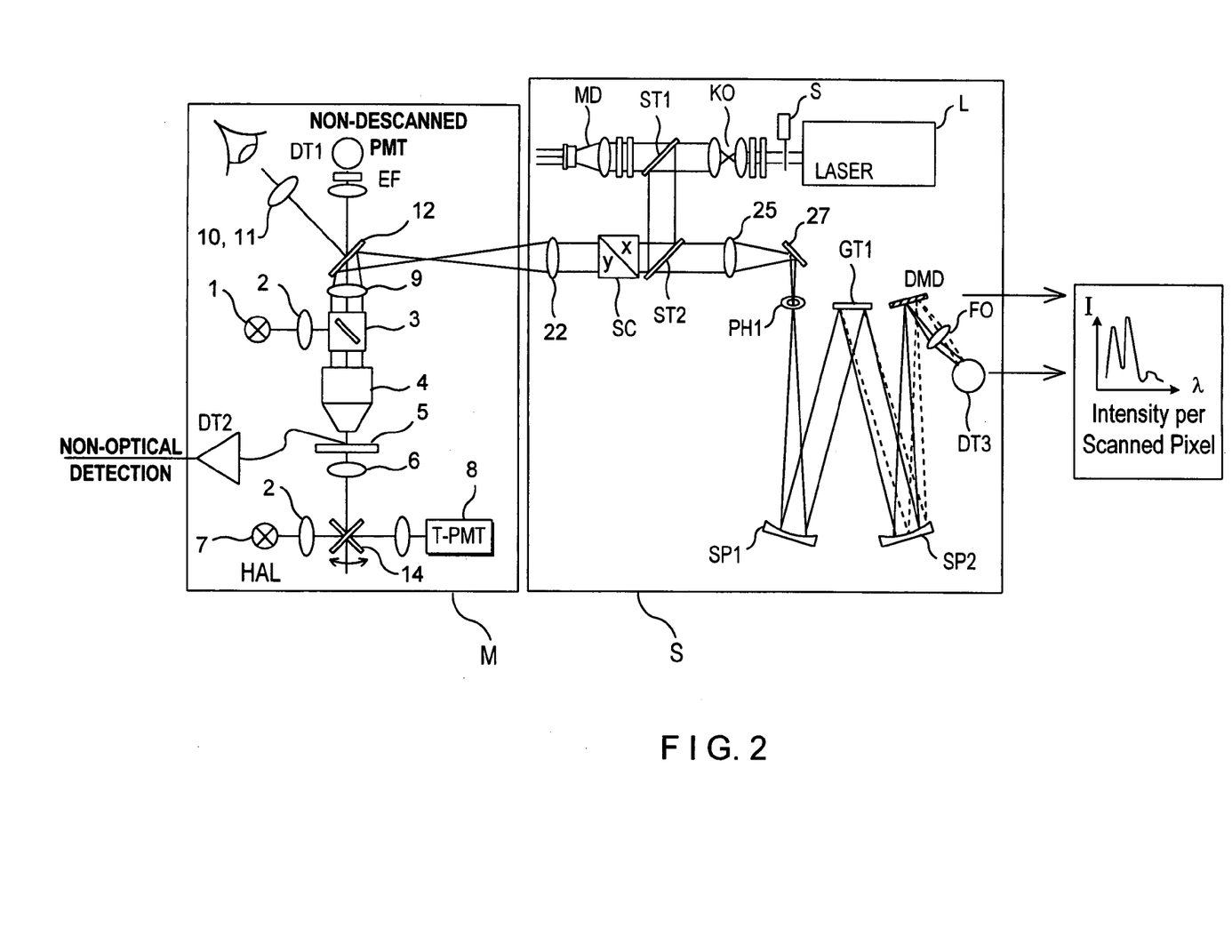
FIG. 2 shows, also in schematic form, a further embodiment of the laser scanning microscope in accordance with the invention.
Figure 10:
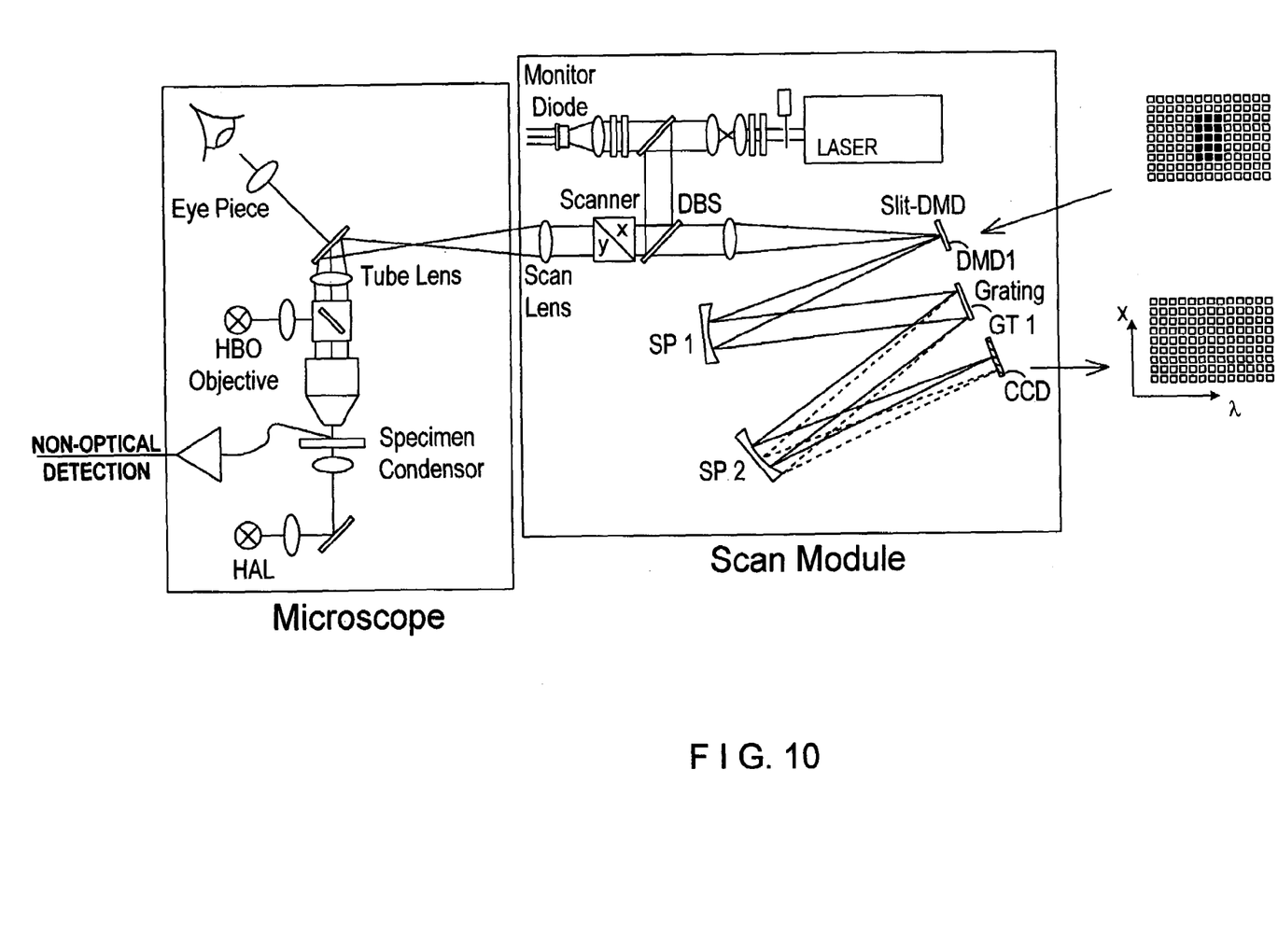
FIG. 10 shows in schematic representation how a line scanning laser scanning microscope can be realized.

A line-scanning laser scanning microscope can be realized in that the laser beam is expanded to a line and scanned over the object by means of only one scanner (one scanning axis) (FIG. 10). When the punctiform pinhole in FIG. 2 is replaced with a slit pinhole along the line-shaped laser beam, the DMD is replaced by a two-dimensional switching mirror array and the detector is replaced by a (sensitivity-enhanced) CCD, the system can be operated in line scanning mode. The scanned line is imaged in one dimension of the DMD array and the spectrum of this object line is imaged in the other coordinate.

The resolving capacity of the spectrometric system can be adapted to the needs of the application in question by exchanging the optical grating or by displacing and rotating the grating (monochromator size)

BRIEF DESCRIPTION OF THE DRAWINGS

In the drawings:

FIG. 8, also in schematic representation, shows an arrangement in accordance with the invention in which the confocal diaphragm as in FIG. 2 can be dispensed with;

DESCRIPTION OF THE PREFERRED EMBODIMENTS

FIG. 1 shows schematically a microscope unit M and a scan head S which have a common optical interface via an intermediate image and form an LSM.

The scan head S can be mounted on the phototube of an upright microscope as well as on a lateral output of an inverse microscope.

The drawings show a microscope beam path which is switchable between incident light scanning and transmitted light scanning by means of a swivelable mirror 14, with a light source 1, illumination optics 2, beam splitter 3, objective 4, specimen stage 5, condenser 6, light source 7, receiver arrangement 8, a tube lens 9, an observation beam path with a tube lens 10 and an eyepiece 11, and a beam splitter/mirror 12 for coupling in the scanning beam. A laser module 13.1, 13.2 holds the laser and is connected via monomode light-conducting fibers 14.1, 14.2 with the laser input coupling unit of the scan head S.

The coupling of radiation into the light-conducting fibers 14.1, 14.2 is carried out by displaceable collimating optics and beam deflecting elements 17.1, 17.2. A monitoring beam path is stopped down by means of a partially reflecting mirror 18 in the direction of a monitor diode 19, wherein line filters 21 and neutral filters 20 are advantageously arranged in front of the monitor diode 19 on a rotatable filter wheel, not shown.

The actual scan unit comprises a scanning objective 22, X/Y scanner 23, main beam splitter 24 and common imaging optics 25 for detection channels 26.1–26.4.

A deflecting prism 27 arranged behind the imaging optics 25 reflects the radiation coming from the object 5 in the direction of dichroic beam splitters 28 in the convergent beam path of the imaging optics 25, wherein pinholes 29 which are displaceable in the direction of and vertical to the optical axis and which are adjustable in diameter are arranged along with emission filters 30 and suitable receiver elements 31 (PMT) individually for each detection channel following the beam splitters 28.

A control unit/computer unit 34 is connected, among others, with the stage 5 and the scanners 23 and controls them.

FIG. 2 shows a possible embodiment form of the laser scanning microscope, according to the invention, comprising a laser unit L followed by shutter S, collimation optics KO, beam splitter ST1 for the output coupling of a monitor beam path MO, a beam splitter ST2 for conducting into scanning means SC and in the direction of detection, a microscope analogous to FIG. 1, with additional detection DT1 outside of the scanning beam path, wherein mirror 12 is constructed in this case as a beam splitter, a detection unit and a control/receiving unit. The radiation emitted from the specimen can (in confocal applications) be focused on a confocal pinhole PH1 positioned in a conjugate object plane. This pinhole PH1 then simultaneously forms the entrance aperture of a (for example, grating GT and imaging mirrors SP1, SP2) monochromator which divides the specimen radiation into its spectral components through its dispersive effect. An at least one-dimensional switching mirror array DMD1 on which the specimen spectrum is optically imaged is located in the focal plane of the dispersive medium (for example, grating), wherein focusing optics FO and a detector DT3 are arranged following the one-dimensional switching mirror array DMD1.

FIGS. 3*a*, *b*: In an advantageous construction, the excitation radiation can advantageously be coupled into the system via the mirror pixels which correspond to the excitation. Accordingly, the need for a main beam splitter (DBS) is circumvented and an appreciably more compact system construction can be realized. In addition, the excitation radiation in this case automatically passes through the detection pinhole as illumination pinhole, which leads to an improvement in the beam quality (spatial filtering) and therefore leads to an improved spatial resolution of the entire microscope system. In addition, in that the mirror utilized for reflecting the excitation radiation is oscillated between two possible mirror positions, the illumination intensity can be adjusted in an almost continuous manner and can be changed in a synchronized manner with respect to the scan pixels (shading compensation, intensity modulation, etc.). A light-coupling fiber F is shown schematically in FIG. 3*a*.

The coupled in laser light (in) reaches a grating GT2, is spectrally divided and is reflected on a DMD arrangement, shown schematically by a line extending along the dispersion direction, via a field lens FL1 for parallelizing.

Through selective switching of individual mirror elements, shown schematically with reference to FIG. 3*b*, determined wavelengths or wavelength areas (excitation light) are reflected back in the ON position in the direction of the grating, while others, in the off position of the mirror, do not travel back to the grating GT2 and are selected.

For the wavelength components (excitation light) reflected back to the grating GT2, the dispersion is eliminated again and they are imaged on a pinhole PH2 in the input of the microscope (out-on) since they impinge on the grating in an offset manner.

The light returning from the object passes through PH2, GT2, FL1, DMD, an additional field lens FL2 in the direction of a detection unit DE shown schematically.

Reflection is carried out in a wavelength-selective manner (out-off) in the direction of detection in the OFF position.

Splitting into individual wavelengths is carried out at the grating GT2 and these individual wavelengths can be detected individually.

Figure 4:
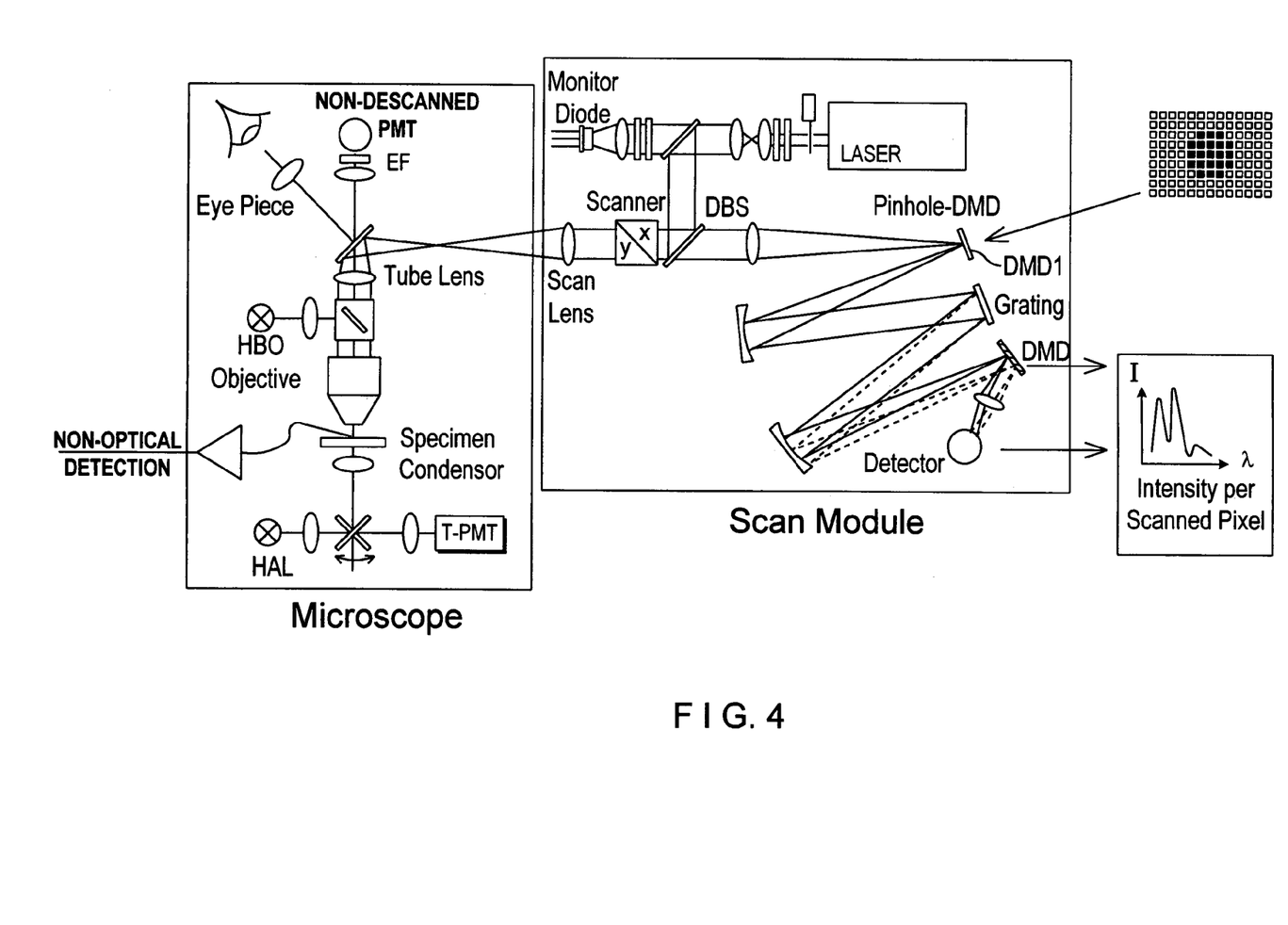
FIG. 4 illustrates in schematic representation how a freely programmable diaphragm (pinhole) can be realized instead of PH1 in FIG. 2.

FIG. 4: A freely programmable confocal diaphragm (pinhole) can be realized instead of PH1 in FIG. 2 by means of another switching mirror array DMD1 which is introduced in a conjugate plane to the object plane. This pinhole is freely programmable with respect to shape and size (adjustable confocal volume) as well as with respect to lateral position, which increases the flexibility of the system and is a great advantage for the adjustment of the optical system (autoadjustment of pinhole). In addition, in multichannel applications, the pinhole size can be synchronized with the spectral band detected at that instant in order that optical sections independent from the wavelength can be realized with the confocal microscope. In addition, the pinhole size can also be advantageously adapted to the intensity of the fluorescent radiation when various fluorescences of very different intensity are present simultaneously in the specimen and are to be detected.

FIG. 5: In a variant, a curved grating GT3 can be used, which likewise takes over the collimation and the dispersion of the radiation to be detected and accordingly results in a smaller quantity of optical components by doing away with the imaging mirrors SP1, SP2 in FIG. 2. The structural size of the arrangement according to the invention in its entirety is accordingly advantageously reduced. This results, above all, in a greater optical stability of the detection system.

Figure 6:
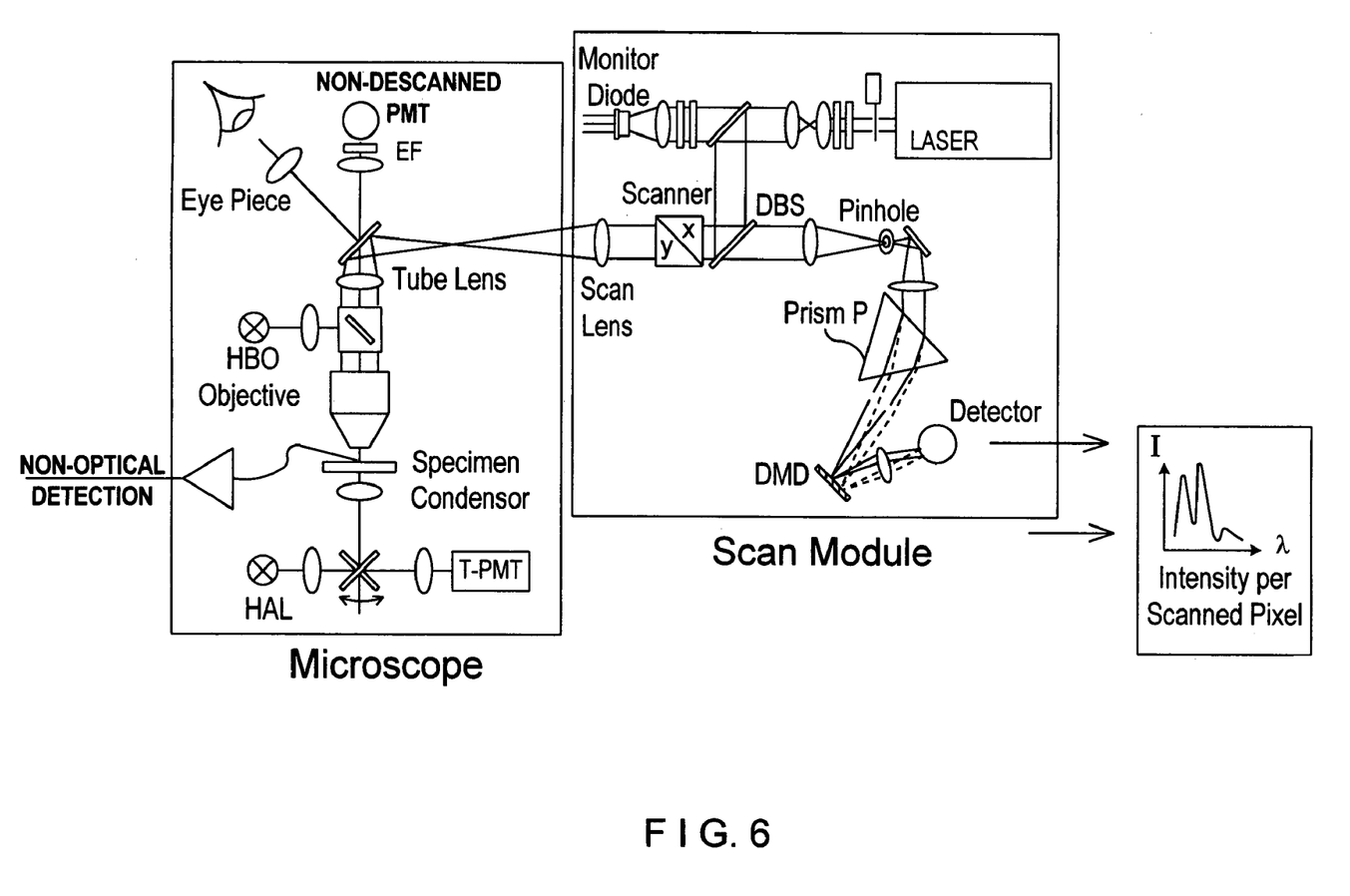
FIG. 6, in another schematically represented embodiment, uses a prism instead of the optical grating.

FIG. 6: In another embodiment form, the optical grating can also be replaced by a prism P. In this way, an increase in the efficiency of the optical system is potentially possible, particularly in the detection of unpolarized light.

FIG. 7 shows a state-of-the-art laser scanning microscope similar to FIG. 1, without reference numbers in this case, at which, by means of an additional fiber F1, a possible embodiment form of the spectroscopic detection system according to the invention as described, for example, in FIG. 5 is coupled out of one of the detection beam paths (26.1 in FIG. 1) directly following the pinhole in order to carry out a spectral characterization of the emission radiation of the microscopic specimen.

FIG. 8: In the case of excitation of multiphoton fluorescence, in the arrangement according to the invention, the confocal diaphragm (PH1 in FIG. 2, DMD1 in FIG. 4) in the monochromator entrance diaphragm plane can be dispensed with and the emission light can be radiated directly onto the dispersive medium as is shown with reference to the arrangement with curved mirror according to FIG. 5.

FIG. 9 shows a further construction as in FIG. 2, but which has, instead of the DMD following the grating GT1, a transmissive modulator MT, for example, of an LCD array, which passes only the relevant wavelengths of the dispersed spectrum to the detector.

A construction of an LCD array instead of a pinhole analogous to the DMD in FIG. 4 in a transmission beam path is also possible in an advantageous manner.

FIG. 10 shows that a line-scanning laser scanning microscope can be realized in that the laser beam is expanded on a line, for example, with a cylinder lens, and scanned over the object by means of only one scanner (one scanning axis), for example, in the Y-direction in this case. When the punctiform pinhole in FIG. 2 is replaced with a slit pinhole along the line-shaped laser beam which is realized by means of a two-dimensional switching mirror array DMD1, represented by the dark mirrors in the shape of a stripe, and the detector is replaced by a (sensitivity-enhanced) CCD, the system can be operated in line scanning mode. The scanned line is imaged in one dimension of the DMD array and the spectrum of this object line is imaged in the other coordinate.

While the foregoing description and drawings represent the preferred embodiments of the present invention, it will be obvious to those skilled in the art that various changes and modifications may be made therein without departing from the true spirit and scope of the present invention.

What is claimed is:

1. A laser scanning microscope comprising:
   a dispersion element operable to spatially disperse an object light coming from an object under study;
   at least one selectively switchable micro-mirror arrangement in a detection beam path which is used for the wavelength selection of the spatially dispersed object light wherein the selected wavelengths that have been spatially dispersed by the dispersion element impinge upon a detector as dispersed light
   wherein the at least one selectivley switchable micro-mirror arrangement comprises a plurality of individually controllable switching mirrors and each one of the plurality of individually controllable switching mirrors are controlled so that the individual spectral components of the specimen radiation are reflected onto the detector sequentially for reception of the entire spectrum.

2. An arrangement according to claim 1 wherein the dispersion element includes at least one of a grating and prism.

3. An optical connection of an arrangement according to claim 1, the detection beam path comprising dichroic beam splitters for splitting the detection beam path into individual channels.

4. The arrangement according to claim 3, wherein the optical connection is carried out via light-conducting fibers.

5. The laser scanning microscope according to claim 1, further comprising a detector pinhole positioned at a conjugate plane to an object plane and operable to provide the object light to the dispersion element.

6. The laser scanning microscope according to claim 5 wherein the dispersion element receives an uncollimated object light from the detector pinhole.

7. A microscope arrangement with a switchable mirror array comprising:
   a detector pinhole operable to receive a detection beam coming from a sample under study;
   a dispersion element operable to spatially disperse the detection beam;
   a switchable mirror arrangement operable to switch selected wavelengths of the spatially dispersed detection beam;
   a focusing element operable to focus the selected wavelengths; and
   a detector operable to receive as dispersed light the focused wavelengths that have been selected by the switchable mirror arrangement and spatially dispersed by the dispersion elements,
   wherein the switchable micro-mirror arrangement comprises a plurality of individually controllable switching mirrors and each one of the plurality of individually controllable switching mirrors are controlled so that the individual spectral components of the specimen radiation are reflected onto the detector sequentially for reception of the entire spectrum.

8. The microscope arrangement according to claim 7 wherein the pinhole includes a second switchable mirror arrangement operable to adjust the size of the entrance aperture.

9. The microscope arrangement according to claim 7, wherein the detector pinhole is positioned at a conjugate plane to an object plane.

10. The microscope arrangement according to claim 9, wherein the dispersion element receives an uncollimated detection beam from the detector pinhole.

* * * * *